(12) United States Patent
Lee et al.

(10) Patent No.: US 10,058,999 B2
(45) Date of Patent: Aug. 28, 2018

(54) WHEELED JUMPING ROBOT

(71) Applicant: LUNGHWA UNIVERSITY OF SCIENCE AND TECHNOLOGY, Taoyuan (TW)

(72) Inventors: Lian-Wang Lee, Taoyuan (TW); Yi-Hsun Lo, Taoyuan (TW); Yu-Fong Lyu, Taoyuan (TW); Rui-Peng Chen, Taoyuan (TW); Chun-Chih Hsu, Taoyuan (TW)

(73) Assignee: Lunghwa University of Science and Technology, Taoyuan (TW)

( * ) Notice: Subject to any disclaimer, the term of this patent is extended or adjusted under 35 U.S.C. 154(b) by 182 days.

(21) Appl. No.: 15/291,327

(22) Filed: Oct. 12, 2016

(65) Prior Publication Data

US 2018/0178381 A1 Jun. 28, 2018

(51) Int. Cl.
| | |
|---|---|
| A63H 11/06 | (2006.01) |
| B25J 9/16 | (2006.01) |
| G05D 1/00 | (2006.01) |
| G05D 1/02 | (2006.01) |
| B62D 61/00 | (2006.01) |
| B60K 17/22 | (2006.01) |
| F03G 1/00 | (2006.01) |
| B25J 5/00 | (2006.01) |

(52) U.S. Cl.
CPC ............ *B25J 9/1666* (2013.01); *A63H 11/06* (2013.01); *B25J 5/007* (2013.01); *B25J 9/162* (2013.01); *B25J 9/1697* (2013.01); *B60K 17/22* (2013.01); *B62D 61/00* (2013.01); *F03G 1/00* (2013.01); *G05D 1/0033* (2013.01); *G05D 1/0214* (2013.01); *G05D 1/0238* (2013.01); *G05D 1/0242* (2013.01); *B60Y 2200/47* (2013.01); *Y10S 901/01* (2013.01); *Y10S 901/47* (2013.01); *Y10S 901/49* (2013.01)

(58) Field of Classification Search
CPC ......... F03G 1/00; B62D 61/00; B62D 57/028; Y10S 901/01; A63H 11/06
See application file for complete search history.

(56) References Cited

U.S. PATENT DOCUMENTS

| 6,247,546 B1 * | 6/2001 | Spletzer ................. B62D 51/06 180/8.5 |
| 6,548,982 B1 * | 4/2003 | Papanikolopoulos . B62D 57/02 318/568.11 |

(Continued)

*Primary Examiner* — Anne Marie M Boehler
*Assistant Examiner* — Michael R Stabley
(74) *Attorney, Agent, or Firm* — Rosenberg, Klein & Lee

(57) ABSTRACT

A wheeled jumping robot includes a body with two wheels, and a board is connected between the two wheels. A driving unit and a jumping unit are respectively connected on two sides of the board. The jumping unit has two rails, and a tubular member is located between the two rails and connected to a threaded rod. A bridge is connected between two rails. Rollers are located between a threaded portion of the threaded rod and a tapered contact face of the bridge. When the threaded rod is rotated, the rollers move toward a pre-set position, the bridge compresses resilient members on the two rails. When the tubular member moves toward the pre-set position, the rollers are separated from the threaded rod due to the tapered contact face, the resilient members bounce back. The wheeled jumping robot includes a processing unit for being communicated with a remote control unit.

9 Claims, 6 Drawing Sheets

(56) References Cited

U.S. PATENT DOCUMENTS

| | | | | |
|---|---|---|---|---|
| 8,083,013 | B2* | 12/2011 | Bewley | B62D 37/00 |
| | | | | 180/199 |
| 8,186,469 | B2* | 5/2012 | Yim | B25J 5/007 |
| | | | | 180/218 |
| 9,381,443 | B2* | 7/2016 | Barse | A63H 33/005 |
| 2007/0259602 | A1* | 11/2007 | Dunham | A63H 17/004 |
| | | | | 446/466 |
| 2015/0111463 | A1* | 4/2015 | Barse | A63H 33/005 |
| | | | | 446/465 |
| 2015/0352454 | A1* | 12/2015 | Barse | A63H 17/262 |
| | | | | 446/465 |
| 2016/0184721 | A1* | 6/2016 | Barse | A63H 11/06 |
| | | | | 446/470 |

\* cited by examiner

WHEELED JUMPING ROBOT

BACKGROUND OF THE INVENTION

1. Fields of the Invention

The present invention relates to a wheeled jumping robot, and more particularly, to a wheeled jumping robot which moves by the wheels and jumps over objects by the jumping unit.

2. Descriptions of Related Art

Robots are used in a wide ranges of applications such as military reconnaissance, space exploration, natural disaster assistance, counter terrorism and archeology related actions. Along with the development of auto-control, electronic technology, computer science, artificial intelligence and photo-electric sensing and information processing, the latest robots are capable of proceeding precise actions to meet the requirements in different tasks. It is noted that there are different types of obstacles when the robots move due to the geographical environment, so that the robots are asked to include high operatability and maneuverability. Besides, the robots are also asked to be able to process information at high speed with better feature to detect, communicate, and process.

One of the conventional ways for movement of the robots are using wheels or tracks, this is mostly used for robots today because the wheels or tracks are easily operated and involve simple structure so that the robots move in a stable status. However, the robots with wheels or tracks can only be used on flat surface, and will be difficult when moving in a complicated terrain. In other words, the robots with wheels or tracks cannot climb over large obstacles such that movement is restricted.

The other conventional way for moving the robots includes multiple legs which imitate animals or human to move, and is more flexible when moving on a complicated terrain. Nevertheless, the legs include multiple joints, trusses and driving motors so as to allow the legs to bend to climb over obstacles. The reliability needs to be improved, and only smaller robots are suitable to be equipped with legs and driving motors.

The present invention intends to provide a wheeled jumping robot to eliminate the shortcomings mentioned above.

SUMMARY OF THE INVENTION

The present invention relates to a wheeled jumping robot and comprises a body having a board. A movable unit is connected to the body and has a driving unit and two wheels. The board is located between the two wheels. The driving unit is located on the first side of the board and located at inside of each of the two wheels. A jumping unit has two resilient members and a transmission unit. The transmission unit is connected with a driving member which drives the transmission unit to compress the resilient members. The transmission unit has two rails, and a tubular member is located between the two rails and connected to a threaded rod. At least one bridge is connected between the tubular member and the two rails. Multiple rollers are located between a threaded portion of the threaded rod and a tapered contact face.

When the threaded rod is driven by the driving member, the rollers move toward a pre-set position, so that the at least one bridge compresses the resilient member to store energy. When the tubular member moves toward the pre-set position by the driving member, the rollers are separated from the threaded rod due to the tapered contact face, and the resilient members bounce back. The resilient members, the transmission unit and the driving member are located on located on the second side of the board.

A processing unit is connected to the movable unit, the driving unit, the transmission unit, the driving member and a receiving unit.

Preferably, the movable unit has a speed reduction unit which is connected to the processing unit.

Preferably, the jumping unit has a speed reduction member which is connected to the processing unit.

Preferably, the processing unit is connected to a sensing unit which detects the distance between the body and an obstacle, and the height of the obstacle, the sensing unit is an infrared sensing unit.

Preferably, the jumping unit has a block which is connected to one end of the driving member and contacts the ground.

Preferably, a remote control unit is used and has a signal transmission device which is located corresponding to the receiving unit. The signal transmission device transmits a signal which is received by the receiving unit, and the processing unit operates by the signal.

Preferably, the processing unit is connected to an image receiving unit which transfers captured images to the signal transmission device by the receiving unit. The remote control unit displays the captured images. Preferably, the body has a cover connected to the second side of the board.

Preferably, the two wheels are made by plastic and coated with cushion members.

The advantages of the present invention are that the users can use the remote control unit to operate the robot to move forward and backward, turn, spin and stop so as to move the robot to a desired position. During the movement, The sensing unit detects the distance between the body and the obstacle, and the height of the obstacle, and the jumping unit is operated to allow the robot to jump over the obstacle at lowest energy consumption. Besides, the present invention uses the image receiving unit to capture the images which are displayed on the remote control unit, such that the users are acknowledged the situation that the robot faces and the status of the robot from distance.

Compared with the conventional robots, the use of the rollers, the threaded rod, the rails and the driving member, the resilient members are compressed and released to let the robot to jump with high efficiency, low energy consumption and is able to precisely positioned.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
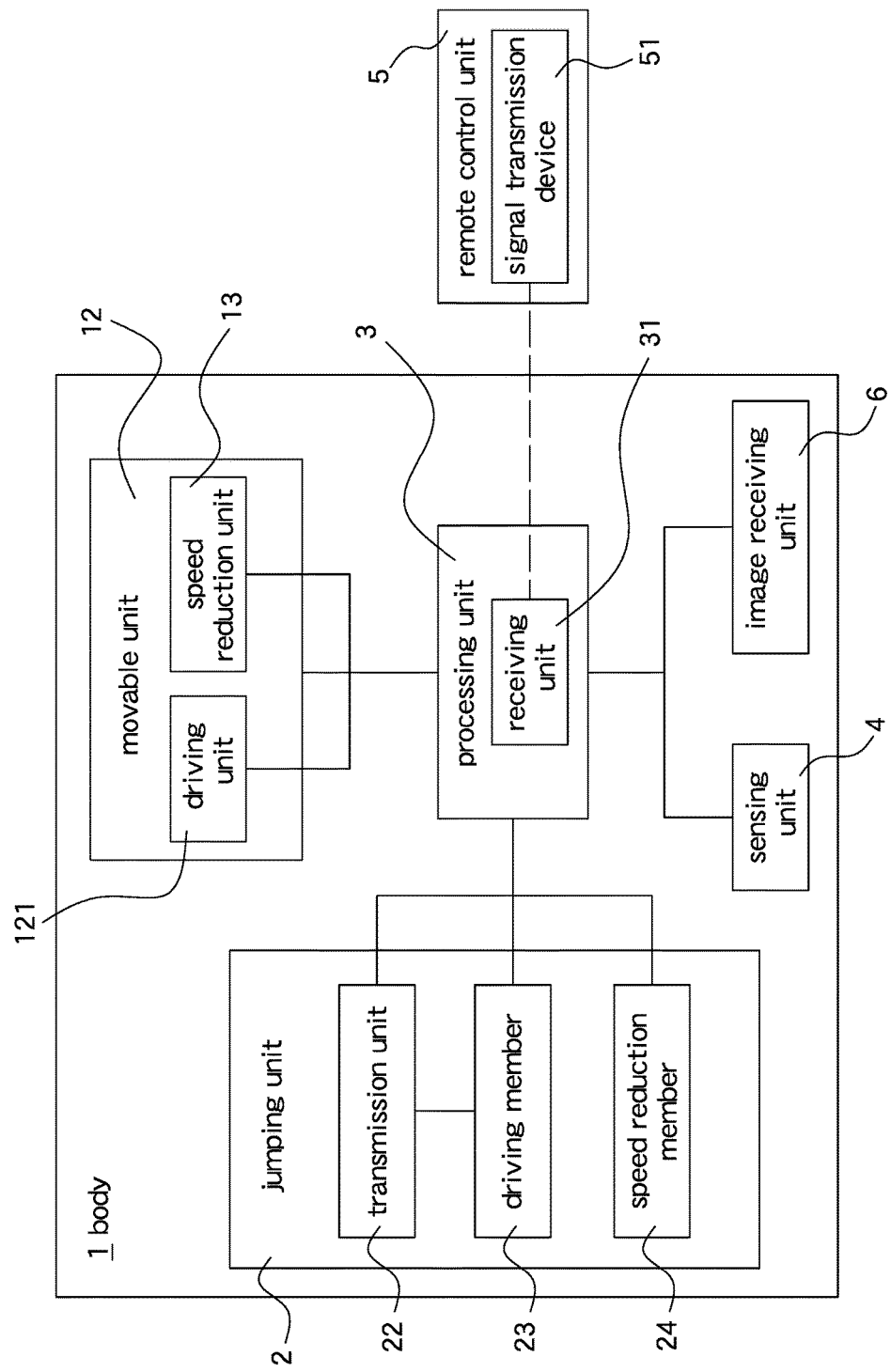
FIG. 1 shows the block diagram of the present invention.
Figure 2:
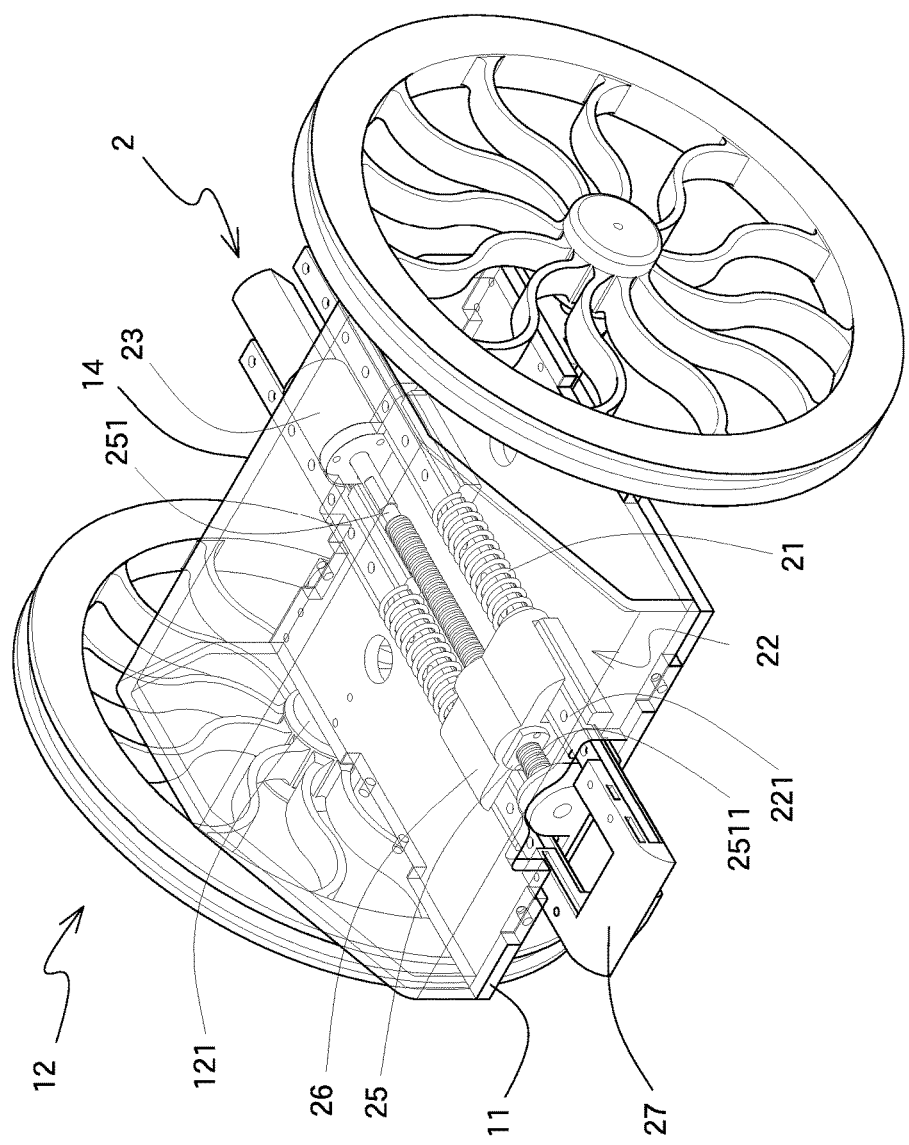
FIG. 2 is a perspective view to show the wheeled jumping robot of the present invention.
Figure 3:
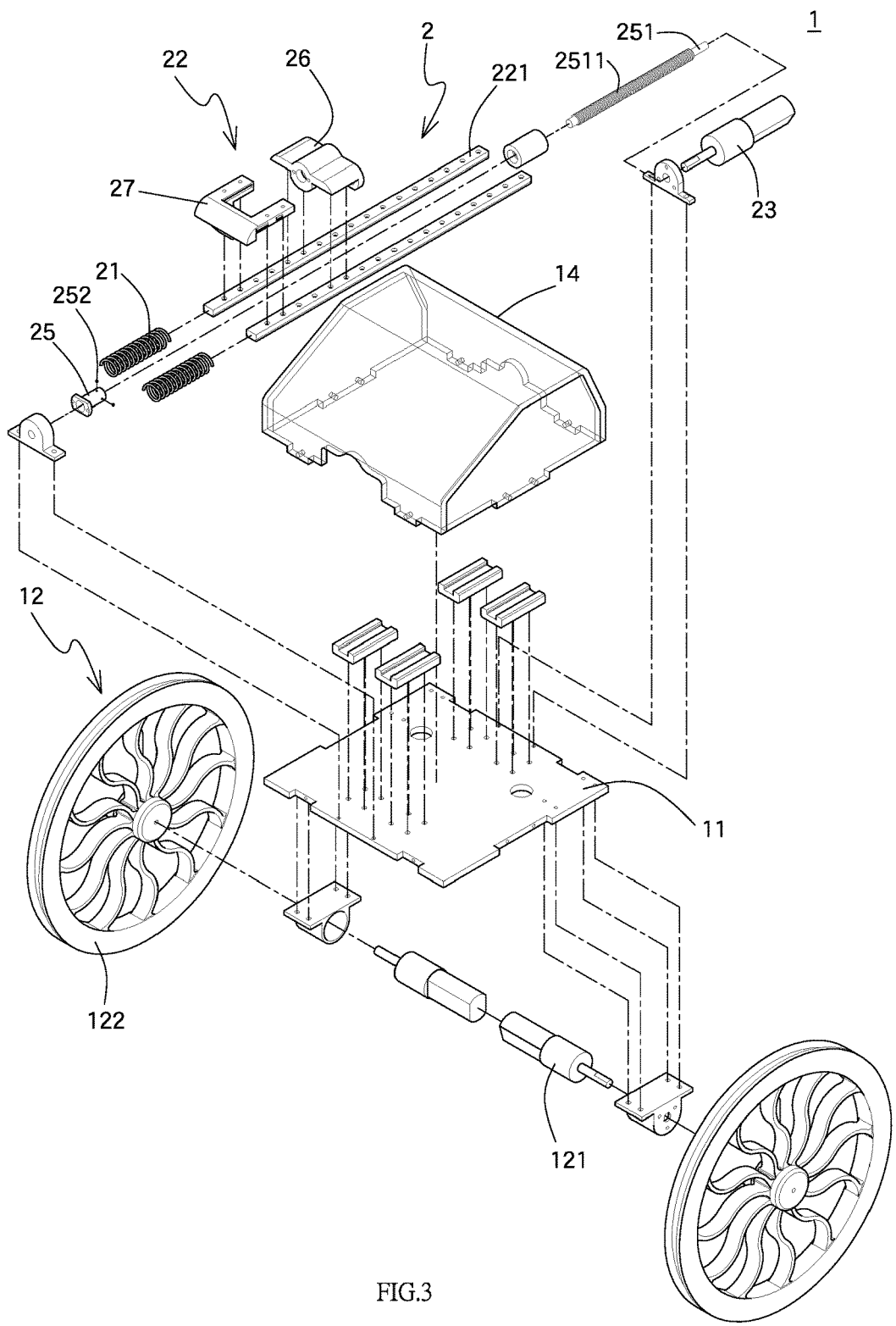
FIG. 3 is an exploded view of the wheeled jumping robot of the present invention.

Referring to FIGS. 1 to 3, the wheeled jumping robot of the present invention comprises a body 1 having a board 11 which is an aluminum board in this embodiment. A movable unit 12 is connected to the body 11 and has a driving unit 121 and two wheels 122, wherein the two wheels 122 are made by plastic and coated with cushion members. The board 11 is located between the two wheels 122. The driving unit 121 is located on a first side of the board 11 and located at inside of each of the two wheels 122. The movable unit 12 has a speed reduction unit 13.

A jumping unit 2 has two resilient members 21 and a transmission unit 22. The resilient members 21 are compression springs. The transmission unit 22 and the resilient members 21 are respectively connected with a driving member 23 which drives the transmission unit 22 to compress the resilient members 21. The resilient members 21, the transmission unit 22 and the driving member 23 are located on located on the second side of the board 11. The jumping unit 2 has a speed reduction member 24. The transmission unit 22 has two rails 221, and a tubular member 25 is located between the two rails 221 and connected to a threaded rod 251. The two resilient members 21 are mounted to the two rails 221. At least one bridge 26 is connected between the tubular member 25 and the two rails 221. Multiple rollers 252 are located between the threaded portion 2511 of the threaded rod 251 and a tapered contact face 261. The bridge 26 contacts the resilient members 21 and located across the two rails 221. When the threaded rod 251 is driven by the driving member 23, the rollers 252 move toward a pre-set position, the bridge 26 compress the resilient members 21. The jumping unit 2 has a block 27 which is connected to one end of the driving member 23 and contacts the ground. When the tubular member 25 moves toward the pre-set position by the driving member 23, the rollers 252 are separated from the threaded rod 251 due to the tapered contact face 261, the resilient members 21 bounce back so that block 27 kicks the ground and the robot jumps. The body 1 further has a cover 14 which is connected to the second side of the board 11.

A processing unit 3 is connected to the movable unit 12, the driving unit 121, the speed reduction unit 13, the transmission unit 22, the speed reduction member 24, the driving member 23, a receiving unit 31 and a sensing unit 4. The sensing unit 4 detects a distance between the body 1 and an obstacle (not shown), and a height of the obstacle. The sensing unit 4 is an infrared sensing unit.

A remote control unit 5 has a signal transmission device 51 which is located corresponding to the receiving unit 31. The signal transmission device 51 transmits a signal which is received by the receiving unit 31, and the processing unit 3 operates by the signal.

An image receiving unit 6 is connected with the processing unit 3. The image receiving unit 6 captures the image of the obstacle and transfers the captured images to the signal transmission device 51 by the receiving unit 31. The captured images are displayed on the remote control unit 5.

The users use the remote control unit 5 such as a smart phone or a tablet computer to control the robot to move by the movable unit 12 or to jump by using the jumping unit 2. When using the movable unit 12 to move the robot horizontally, the remote control unit 5 sends a signal from the signal transmission device 51 to the receiving unit 31, and the processing unit 3 sends a command to the driving unit 121 (a DC motor for example) to drive the wheels 122 so that the robot moves along the horizontal surface. Because the movable unit 12 has the speed reduction unit 13, so that when the body 1 moves by the wheels 122, the speed reduction unit 13 reduces the speed of the wheels 122 when necessary. Furthermore, by using the processing unit 3 to control the input voltage to the driving unit 121, the output speed of the wheels 122 can be controlled to manage the specific speed of each of the single wheel 122 to change the speed and the direction that the body 1 moves. The two wheels 122 are made by plastic and coated with cushion members such as sponge so as to absorb vibration when moving. When moving in horizontal direction, the block 27 of the jumping unit 2 slightly contacts the ground to prevent the robot from pivoting due to gravity. The cover 14 is mounted to the second side of the board 11 to prevent dust and rain from accessing the parts covered by the cover 14.

Figure 4:
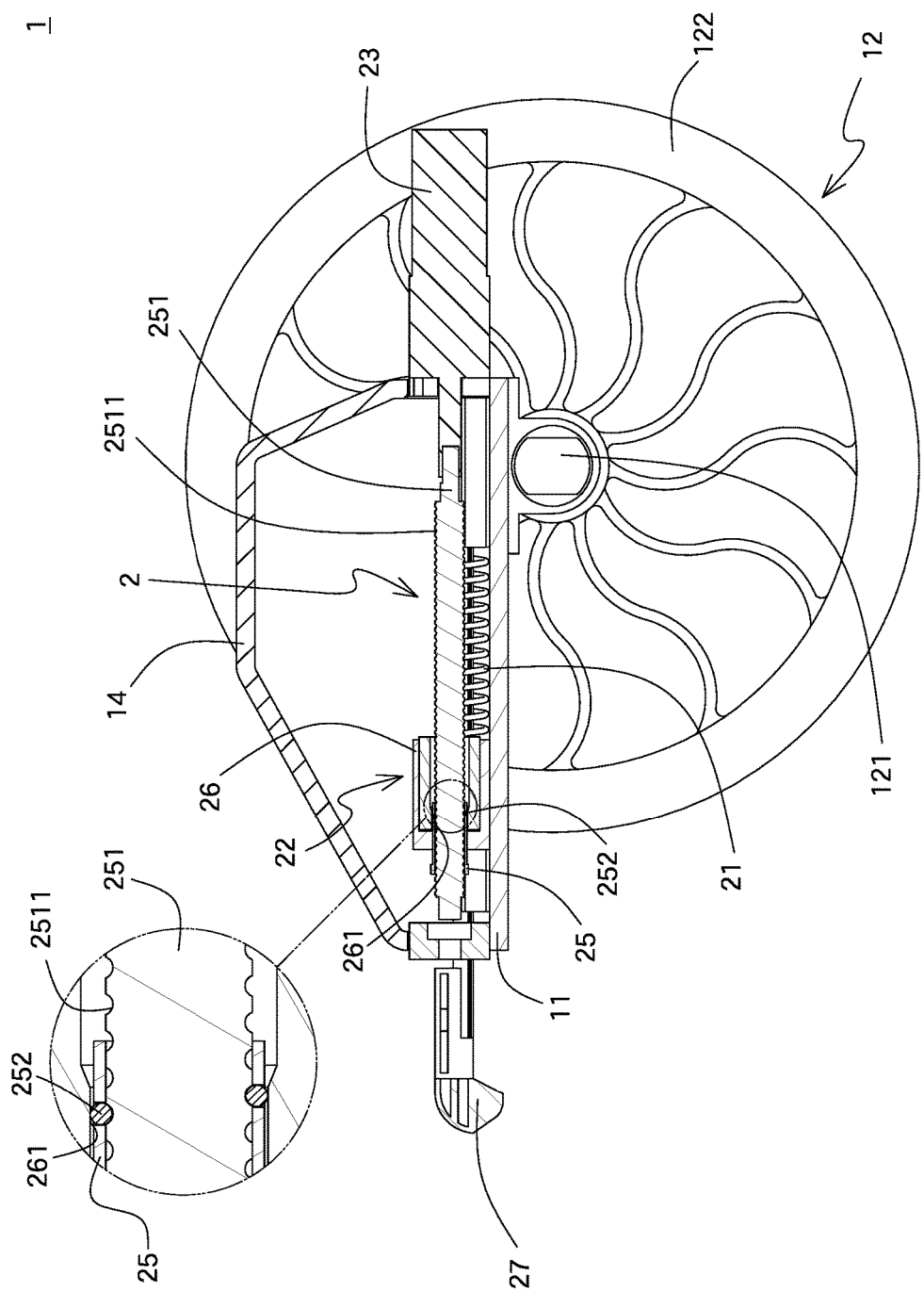
FIG. 4 is a cross sectional view to show that the rollers contact the threaded portion and the tapered face.
Figure 5:
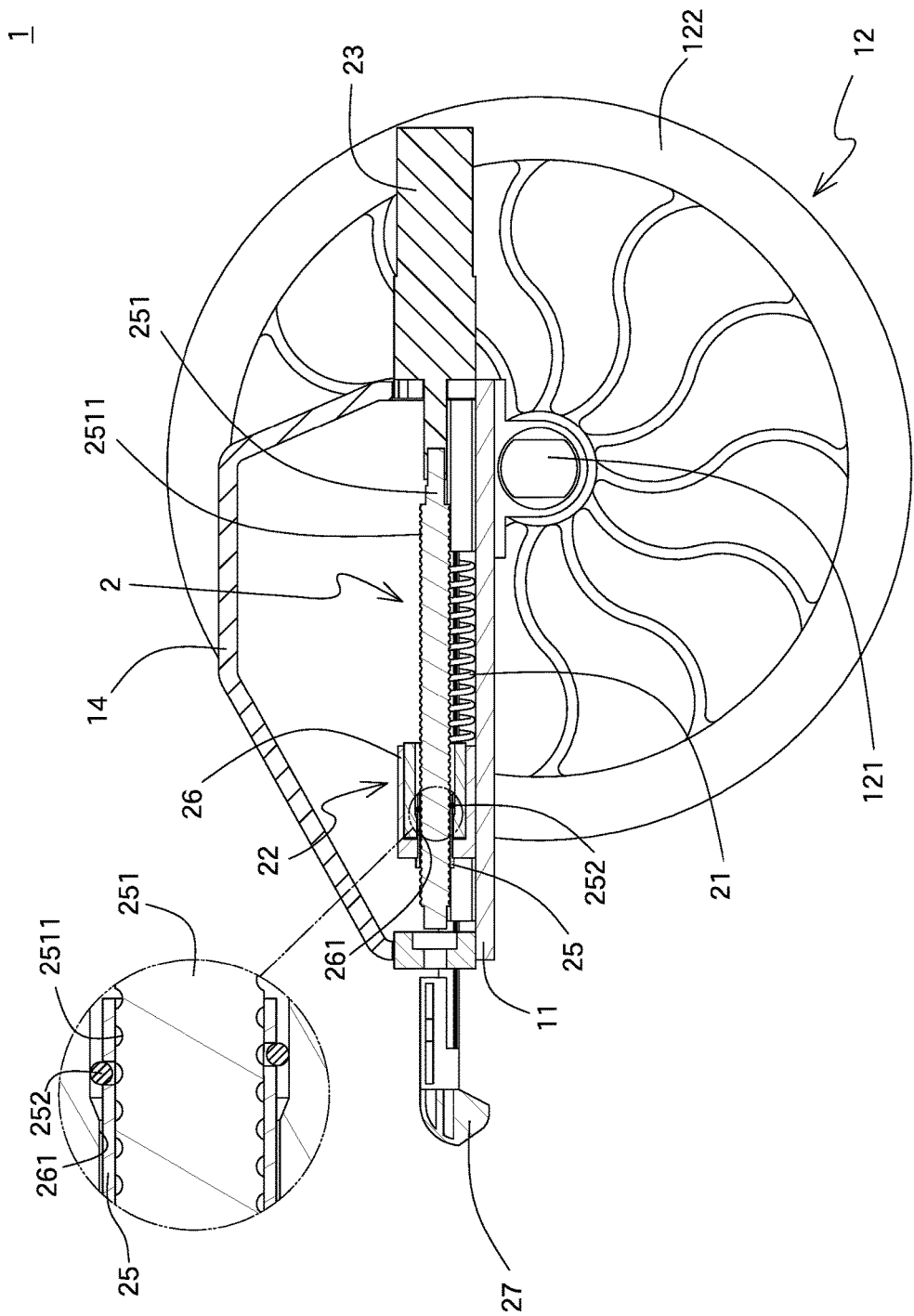
FIG. 5 is a cross sectional view to show that the bridge is in operation and the rollers are separated from the threaded portion.
Figure 6:
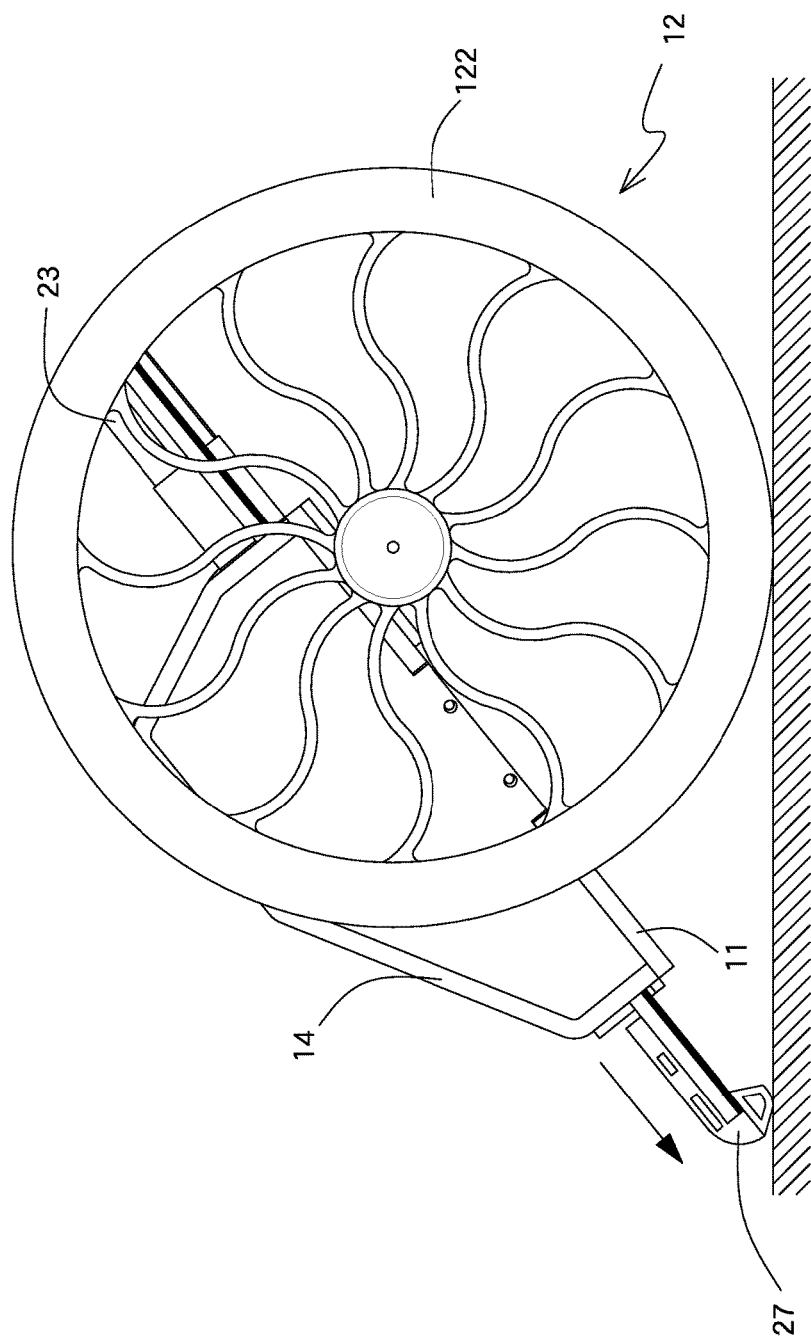
FIG. 6 shows the operation of the wheeled jumping robot of the present invention.

As shown in FIG. 4, when the robot needs to jump over an obstacle, the image receiving unit 6 captures the image of the obstacle and transfers the captured images to the signal transmission device 51 by the receiving unit 31, therefore, the users are able to monitor the image on the remote control unit 5. The users operates the remote control unit 5 to transfer signals about the direction and the angle of the wheels 122 to the processing unit 3 which then activates the driving unit 121 to adjust the direction and the angle of the wheels 122. The sensing unit 4 detects the distance between the body 1 and an obstacle (not shown), and the height of the obstacle. The detected information is sent to the processing unit 3 to be processed. The rollers 252 are engaged between the threaded portion 2511 and the tapered contact face 261, so that the processing unit 3 activates the driving member 23 of the jumping unit 2 such as a DC motor, to rotate the threaded rod 251 and rollers 252 roll to change electric energy into mechanical energy. In one embodiment, the threaded rod 251 is a ball screw 251 which has high efficiency of transmission and positioning feature, so as to reduce about 30% driving torque of conventional threaded rod 251 to reduce consumption of energy. The bridge 26 moves toward the resilient members 21 along the rails 221 to compress the resilient members 21. In one embodiment, the rails 221 are linear rails which provide smaller friction so that the driving member 23 moves the tubular member 25 with limited driving force. This feature is suitable for being operated at high speed. As shown in FIGS. 5 and 6, the block 27 contacts the ground, when the tubular member 25 moves to the pre-set position, the rollers 252 are separated from the threaded rod 251 because of the tapered contact face 261, so that the bridge 26 moves away from the resilient members 21 because the resilient members 21 bounce back. In other words, the block 27 receives a reaction force from the ground and makes the robot to jump over the obstacle. Because the sensing unit 4 detects the distance between the body 1 and the obstacle (not shown), and the height of the obstacle, so that the robot jumps over the obstacle within the minimum height which saves energy for the robot and allows the robot not to hit the obstacle. Besides, because when the robot lands again, the wheels 122 and the board 11 receive a significant force, so that the thickness of the board 11 is increased to bear the force, and the two wheels 122 are made by plastic and coated with cushion members such as sponge to have proper cushion feature.

Furthermore, the robot is able to jump intermittently when moving along a flat surface, the image receiving unit 6 captures the image abound the robot and transfers the captured images to the signal transmission device 51 by the receiving unit 31, therefore, the users are able to monitor the image on the remote control unit 5 and send commands to the robot.

While we have shown and described the embodiment in accordance with the present invention, it should be clear to those skilled in the art that further embodiments may be made without departing from the scope of the present invention.

What is claimed is:

1. A wheeled jumping robot comprising:
   a body having a board, a movable unit connected to the body and having driving units and two wheels, the board located between the two wheels, the driving units located on a first side of the board and respectively located at an inside of each of the two wheels;
   a jumping unit having two resilient members and a transmission unit, the transmission unit connected with a driving member which drives the transmission unit to compress the resilient members, the transmission unit having two rails, a tubular member located between the two rails and connected to a threaded rod, at least one bridge connected between the tubular member and the two rails, multiple rollers being located between a threaded portion of the threaded rod and a tapered contact face, when the threaded rod is driven by the driving member, the rollers move toward a pre-set position, the at least one bridge compresses the resilient members, when the tubular member moves toward the pre-set position by the driving member, the rollers are separated from the threaded rod due to the tapered contact face, the resilient members bounce back, the resilient members, the transmission unit and the driving member located on a second side of the board, and
   a processing unit connected to the movable unit, the driving units, the transmission unit, the driving member and a receiving unit.

2. The wheeled jumping robot as claimed in claim 1, wherein the movable unit has a speed reduction unit which is connected to the processing unit.

3. The wheeled jumping robot as claimed in claim 2, wherein the jumping unit has a speed reduction member which is connected to the processing unit.

4. The wheeled jumping robot as claimed in claim 1, wherein the processing unit is connected to a sensing unit which is adapted to detect a distance between the body and an obstacle, and a height of the obstacle, the sensing unit is an infrared sensing unit.

5. The wheeled jumping robot as claimed in claim 1, wherein the jumping unit has a block which is connected to one end of the driving member and adapted to contact ground.

6. The wheeled jumping robot as claimed in claim 1 further comprising a remote control unit which has a signal transmission device, the signal transmission device transmitting a signal which is received by the receiving unit, the processing unit operates by the signal.

7. The wheeled jumping robot as claimed in claim 6, wherein the processing unit is connected to an image receiving unit which is adapted to transfer captured images to the signal transmission device by the receiving unit, the remote control unit is adapted to display the captured images.

8. The wheeled jumping robot as claimed in claim 1, wherein the body has a cover which is connected to the second side of the board.

9. The wheeled jumping robot as claimed in claim 1, wherein the two wheels are made by plastic and coated with cushion members.

\* \* \* \* \*